(12) United States Patent
Ory (10) Patent No.: US 8,499,989 B1
(45) Date of Patent: Aug. 6, 2013

(54) MOTORCYCLE MOUNTED HELMET CARRIER

(76) Inventor: Michael A. Ory, Naperville, IL (US)

( * ) Notice: Subject to any disclaimer, the term of this patent is extended or adjusted under 35 U.S.C. 154(b) by 136 days.

(21) Appl. No.: 13/136,834

(22) Filed: Aug. 13, 2011

Related U.S. Application Data (60) Provisional application No. 61/403,040, filed on Sep. 10, 2010.

(51) Int. Cl.
*B62J 7/00* (2006.01)

(52) U.S. Cl.
USPC .......................... 224/413; 224/423; 224/441

(58) Field of Classification Search
USPC ......... 224/423, 441–442, 412–413, 459–460, 224/447–452, 454–455; D12/407
See application file for complete search history.

(56) References Cited

U.S. PATENT DOCUMENTS

| | | | | |
|---|---|---|---|---|
| 670,503 A | * | 3/1901 | Cowles | 224/422 |
| 3,357,731 A | * | 12/1967 | Piget | 403/217 |
| 3,399,855 A | | 9/1968 | Takao | |
| 3,531,955 A | | 10/1970 | Taylor et al. | |
| 3,625,405 A | * | 12/1971 | Kezar et al. | 224/413 |
| 3,646,786 A | | 3/1972 | Baker | |
| 3,759,072 A | | 9/1973 | McLarnon | |
| 3,896,643 A | | 7/1975 | Kawakami | |
| 4,024,738 A | | 5/1977 | Pi | |
| 4,063,637 A | | 12/1977 | Danforth | |
| 4,274,271 A | | 6/1981 | Todd et al. | |
| 4,311,261 A | * | 1/1982 | Anderson et al. | 224/418 |
| 4,733,805 A | | 3/1988 | Sawada | |
| 5,127,561 A | | 7/1992 | Miyamoto | |
| 5,332,183 A | * | 7/1994 | Kagayama | 248/222.13 |
| 5,531,364 A | | 7/1996 | Buis | |
| 5,884,825 A | | 3/1999 | Schroeder | |
| 6,116,064 A | | 9/2000 | Driscoll | |
| 6,698,257 B2 | | 3/2004 | Kulas | |
| D504,607 S | * | 5/2005 | Alfaro | D8/367 |
| 7,159,423 B1 | | 1/2007 | Mrdeza | |
| 2003/0173386 A1 | * | 9/2003 | Scaccia | 224/413 |
| 2004/0118888 A1 | | 6/2004 | Russell | |
| 2008/0023604 A1 | * | 1/2008 | Bottomley et al. | 248/223.41 |

* cited by examiner

*Primary Examiner* — Nathan J Newhouse
*Assistant Examiner* — Scott McNurlen
(74) *Attorney, Agent, or Firm* — Tipton L. Randall (57) ABSTRACT

A motorcycle mounted helmet carrier device includes a pair of linear support members each having first and second ends, each support member with a helmet receiving support plate member at the first end thereof. A linear connecting rod member is secured at each end to one linear support member to maintain the pair of support members in parallel register. The second end of each linear support member attaches to a motorcycle. Each linear support member includes at least one aperture adjacent the helmet receiving support plate at the first end thereof. Each linear support member with aperture therein is adapted for locking a helmet supported upright upon the support plate to the linear support member.

6 Claims, 10 Drawing Sheets

MOTORCYCLE MOUNTED HELMET CARRIER

CROSS-REFERENCE TO RELATED APPLICATIONS, IF ANY

This application claims the benefit under 35 U.S.C. §119 (e) of provisional application Ser. No. 61/403,040, filed 10 Sep. 2010. Application Ser. No. 61/403,040 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a helmet carrier and, more particularly, to a helmet carrier for a safety helmet and, most particularly, to a motorcycle mounted safety helmet carrier that provides secure support for a safety helmet stored in an upright position.

2. Background Information

The wearing of a safety motorcycle helmet when operating or riding on a motorcycle is required by many states, while wearing a safety motorcycle helmet is optional in many other states. Most motorcycle operators and passengers choose to wear such helmets when on the machine. When such individuals dismount from the motorcycle, they will take off the helmet, particularly if they do not plan to ride again soon. Because motorcycles have limited storage space, finding a secure storage location for the motorcycle helmet on the motorcycle presents problems. In addition, it is desirable to prevent theft of the motorcycle helmet, if left unattended.

A number of patents have been granted for devices used to secure a safety helmet to a motorcycle or similar vehicle. These patents include U.S. Pat. No. 3,399,855 by Tako Shirai, U.S. Pat. No. 3,531,955 by Taylor et al., U.S. Pat. No. 3,646,786 by Baker, U.S. Pat. No. 3,759,072 by McLarnon, U.S. Pat. No. 3,896,643 by Kawakami, U.S. Pat. No. 4,024,738 by Pi, U.S. Pat. No. 4,063,637 by Danforth, U.S. Pat. No. 4,274,271 by Todd et al., U.S. Pat. No. 4,733,805 by Sawada, U.S. Pat. No. 5,127,561 by Miyamoto, U.S. Pat. No. 5,531,364 by Buis, U.S. Pat. No. 5,884,825 by Schroeder, U.S. Pat. No. 6,116,064 by Driscoll, U.S. Pat. No. 6,698,257 by Kulas, U.S. Pat. No. 7,159,423 by Mrdeza et al., and U.S. Pat. Application No. 2004/0118888 by Russell. Each of the disclosed devices used to secure a safety helmet to a motorcycle has shortcomings in this area of technology. Applicant has invented a motorcycle mounted helmet carrier that overcomes these short-comings and provides a decided improvement over existing technology.

SUMMARY OF THE INVENTION

The invention is a motorcycle mounted helmet carrier device that includes a pair of linear support members, each having first and second ends. Each support member has a helmet receiving support plate member at the first end thereof. A linear connecting rod member is secured at each end to one linear support member to maintain the pair of support members in parallel register. The second end of each linear support member attaches to a motorcycle. Each linear support member includes at least one aperture adjacent the helmet receiving support plate at the first end thereof. Each linear support member with aperture therein is adapted for locking a helmet supported upright upon the support plate to the linear support member.

In one embodiment of the helmet carrier invention, the second end of the linear support members each including an offset section with fastener apertures there through. The offset section secures each linear support member to a storage trunk on the motorcycle. A pair of attachment clip members is each fastened at a first end to the linear connector rod member and fastened at a second end to the storage trunk on the motorcycle.

In another embodiment of the helmet carrier invention, an attachment bracket member is secured to the second end of each linear support member. The bracket member is secured to a rear fender of a motorcycle.

DESCRIPTION OF THE EMBODIMENTS

Nomenclature

10 Motorcycle Mounted Helmet Carrier Device
20 Linear Support Member
22 First End of Support Member
24 Second End of Support Member 26 Offset Section of Support Member
27 Fastener Aperture of Offset Section
28 Large Apertures of Linear Support Member
30 Helmet Receiving Support Plate Member
40 Connecting Rod Member
42 End of Rod Member
44 End of Rod Member
46 Threaded Channels in Connecting Rod Member
48 Fastener Aperture in Support Member
50 Attachment Clip Members
52 First End of Clip Member
54 Second End of Clip Member
60 Attachment Bracket Member
62 Welded Attachment Nut of Bracket Member
64 Aperture of Bracket Member
66 Bracket Fastener Apertures
68 Alignment Grooves for Attachment Bracket Member
70 Locking Device
D D-ring of Helmet Strap
F Fender of Motorcycle
H Motorcycle Safety Helmet
R Storage Rack of Rear Fender
T Storage Trunk of Motorcycle Construction The invention is a motorcycle mounted helmet carrier device that includes a pair of linear support members, each having first and second ends. Each support member has a helmet receiving support plate member at the first end thereof. A linear connecting rod member is secured at each end to one linear support member to maintain the pair of support members in parallel register. The second end of each linear support member attaches to a motorcycle. Each linear support member includes at least one aperture adjacent the helmet receiving support plate at the first end thereof. Each linear support member with aperture therein is adapted for locking a helmet supported upright upon the support plate to the linear support member.

Figure 1:
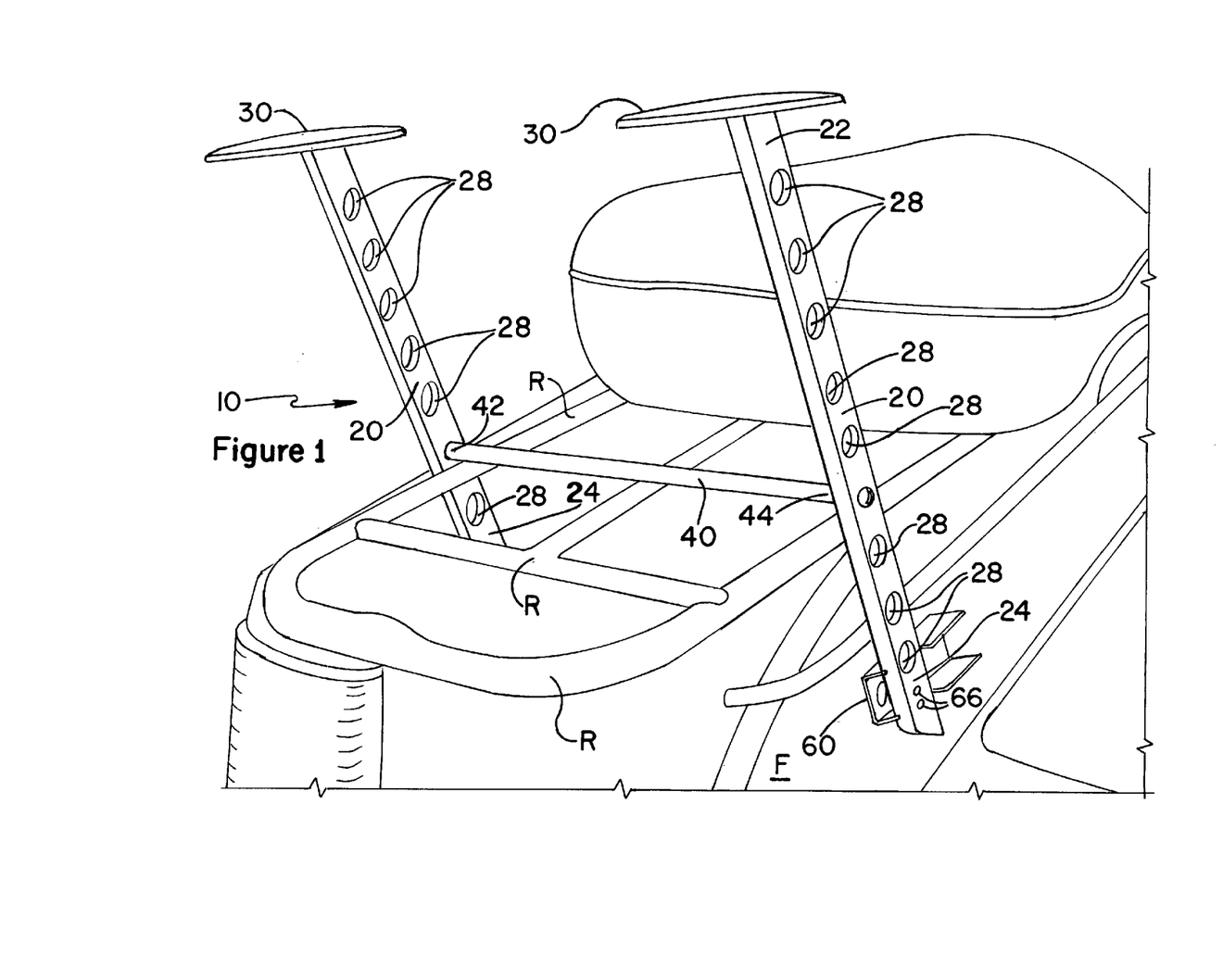
FIG. 1 is a perspective view of a first embodiment of the motorcycle mounted helmet carrier of the present invention mounted on a motorcycle.
Figure 2:
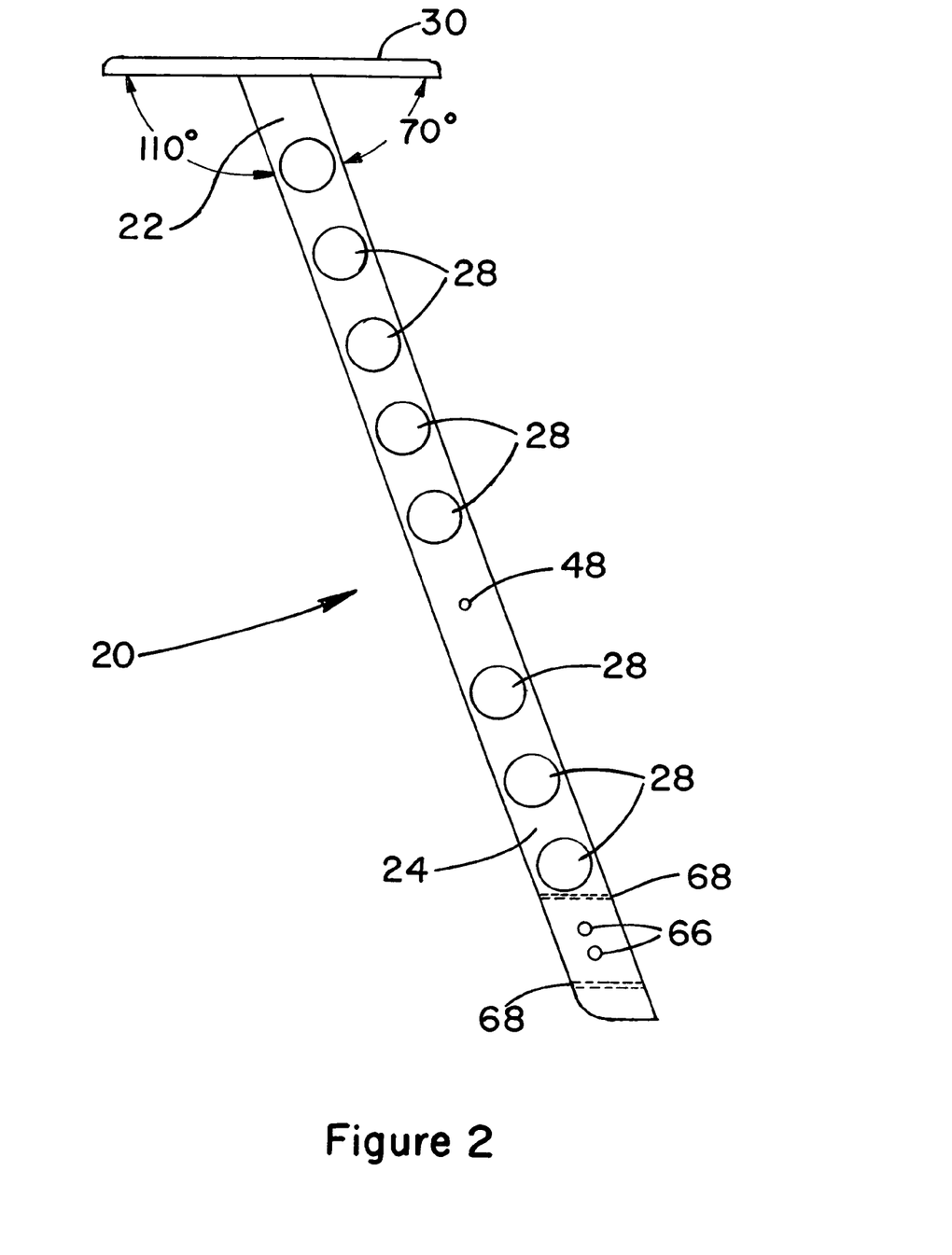
FIG. 2 is a perspective view of the linear support and helmet pad of the first embodiment of the motorcycle mounted helmet carrier of the present invention.
Figure 3:
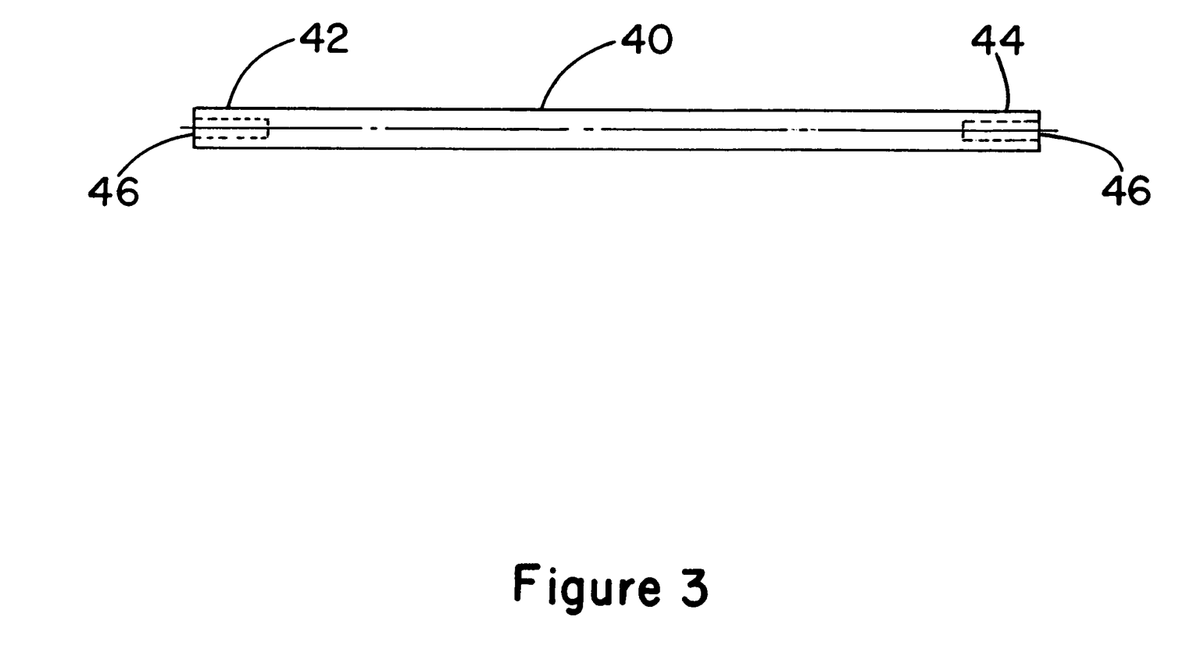
FIG. 3 is a perspective view of the connecting brace of the first embodiment of the motorcycle mounted helmet carrier of the present invention.
Figure 4A:
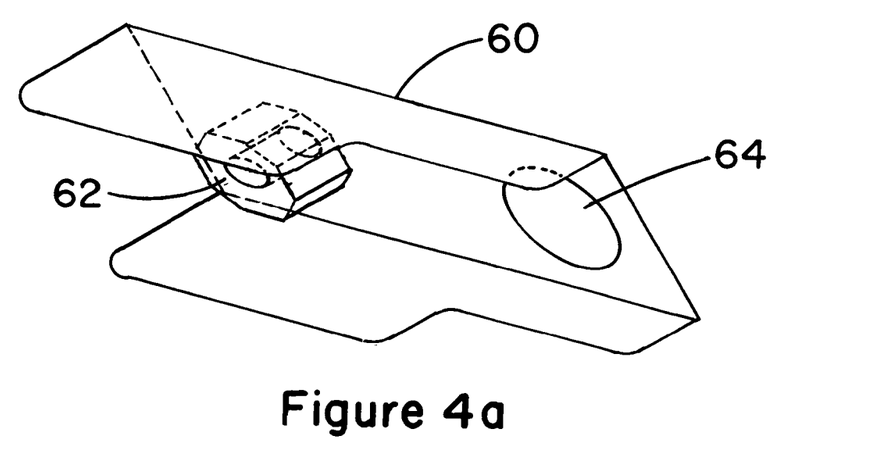
FIG. 4a is a perspective view of one fender attachment bracket of the first embodiment of the motorcycle mounted helmet carrier of the present invention.
Figure 4B:
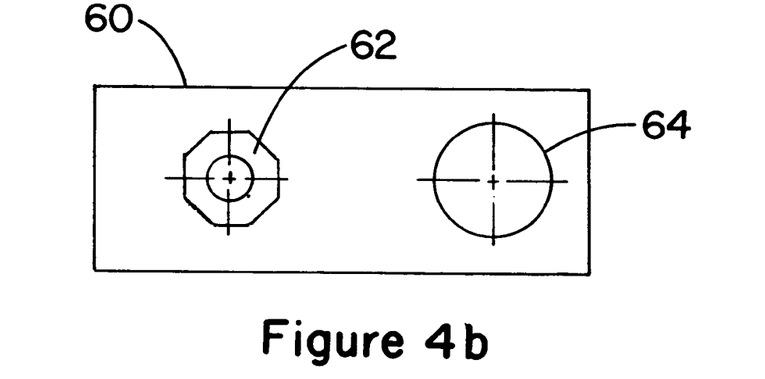
FIG. 4b is a side view of one fender attachment bracket of the first embodiment of the motorcycle mounted helmet carrier of the present invention.
Figure 4C:
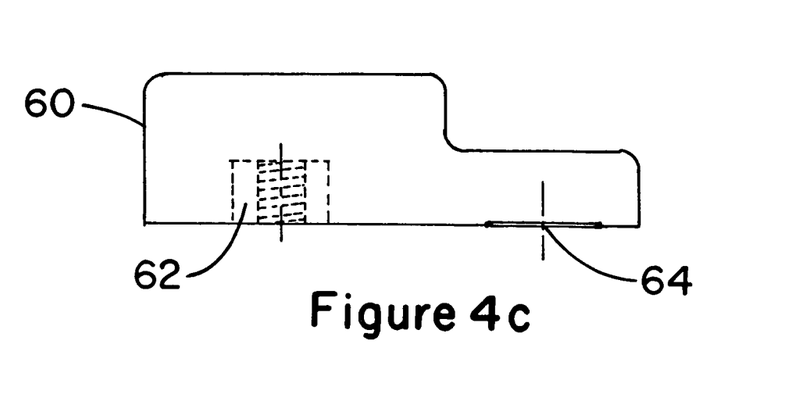
FIG. 4c is a bottom view of one fender attachment bracket of the first embodiment of the motorcycle mounted helmet carrier of the present invention.

Referring now to FIGS. 1-5, a first embodiment of the motorcycle helmet carrier device 10 is shown. The helmet carrier device 10 includes a pair of linear support members 20, each having a first end 22 and a second end 24, as shown in FIG. 2. Each support member 20 has a helmet receiving support plate member 30 that is planar and mounted at a slight angle at the first end 22 of the linear support member 20. The support plate member 30 is sized to fit against the interior top surface of a motorcycle safety helmet H. A pair of threaded fasteners (not shown) secure each helmet receiving support plate member 30 to the first end 22 of the linear support member 20. A linear connecting rod member 40 (FIG. 3) is secured at each end 42, 44 to one linear support member 20 to maintain the pair of support members 20 in parallel register when fastened to the rear fender F of a motorcycle, as shown in FIG. 1. Preferably, each end 42, 44 of the connecting rod member 40 includes a threaded channel 46 that accepts a threaded fastener inserted through a fastener aperture 48 at about a midpoint of each linear support member 20. The second end 24 of each linear support member 20 attaches to the rear fender F a motorcycle by means of an attachment bracket member 60, illustrated in FIGS. 4a-4c. The attachment bracket member 60 is U-shaped with a welded attachment nut 62 and an aperture 64 for securing the linear support member 20 to the rear fender F with appropriates screws and/or bolts. The second end 24 of each linear support member 20 includes a pair of fastener apertures 66 bracketed by a pair of parallel grooves 68, with one outer edge of the attachment bracket member 60 inserted into each groove 68, as shown in FIG. 1. Anchoring the second end 24 of each linear support member 20 to the rear fender F allows the helmet carrier device 10 to straddle the storage rack R atop the rear fender F, with the connecting rod member 40 atop the storage rack R, as illustrated in FIG. 1. Preferably, the helmet carrier device 10 is secured to the rear fender F such that the helmet carrier device 10 extends rearward and away from the seating area of the motorcycle, as illustrated.

Figure 5:
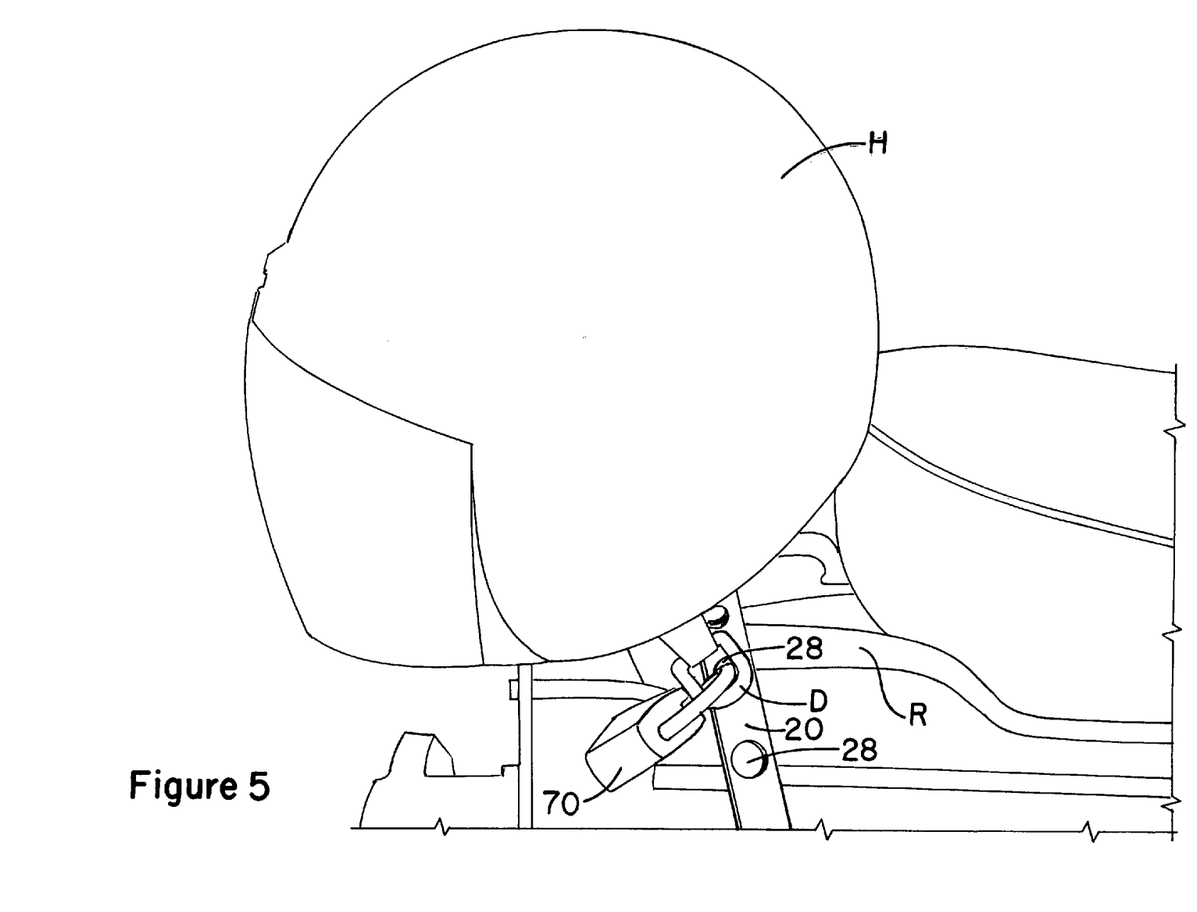
FIG. 5 is a perspective view of the first embodiment of the motorcycle mounted helmet carrier of the present invention with a helmet secure thereto with a locking device.

Each linear support member 20 of the helmet carrier device 10 includes at least one large aperture 28 adjacent the helmet receiving support plate member 30 at the first end 22 thereof. In the embodiment of the helmet carrier device 10 of FIGS. 1-5, each linear support member 20 includes a plurality of evenly spaced, large apertures 28 along the length of each support member 20. Each linear support member 20 with apertures 28 therein is adapted for locking a motorcycle safety helmet H supported upright upon the support plate member 30 to the linear support member 20 with a locking device 70, as illustrated in FIG. 5. The upright supported helmet H is locked to the helmet carrier device 10, for example, by passing the clasp of a padlock 70 through the D-ring D of the helmet strap and one of large apertures 28 of the support member 20, and then closing the clasp of the padlock 70. The safety helmet H is maintained in an upright position and cannot be lifted off the helmet support plate member 30 on the support member 20. The upright orientation of the safety helmet H prevents rain or snow from entering the interior of the helmet H when positioned and/or locked on the helmet carrier device 10.

In a preferred embodiment of the invention, the linear support members 20, the helmet receiving support plate members 30 and the linear connecting rod member 40 of the motorcycle mounted helmet carrier device 10 of FIGS. 1-5 are fabricated from cast aluminum for durability, corrosion resistance and lightness of weight.

Figure 6:
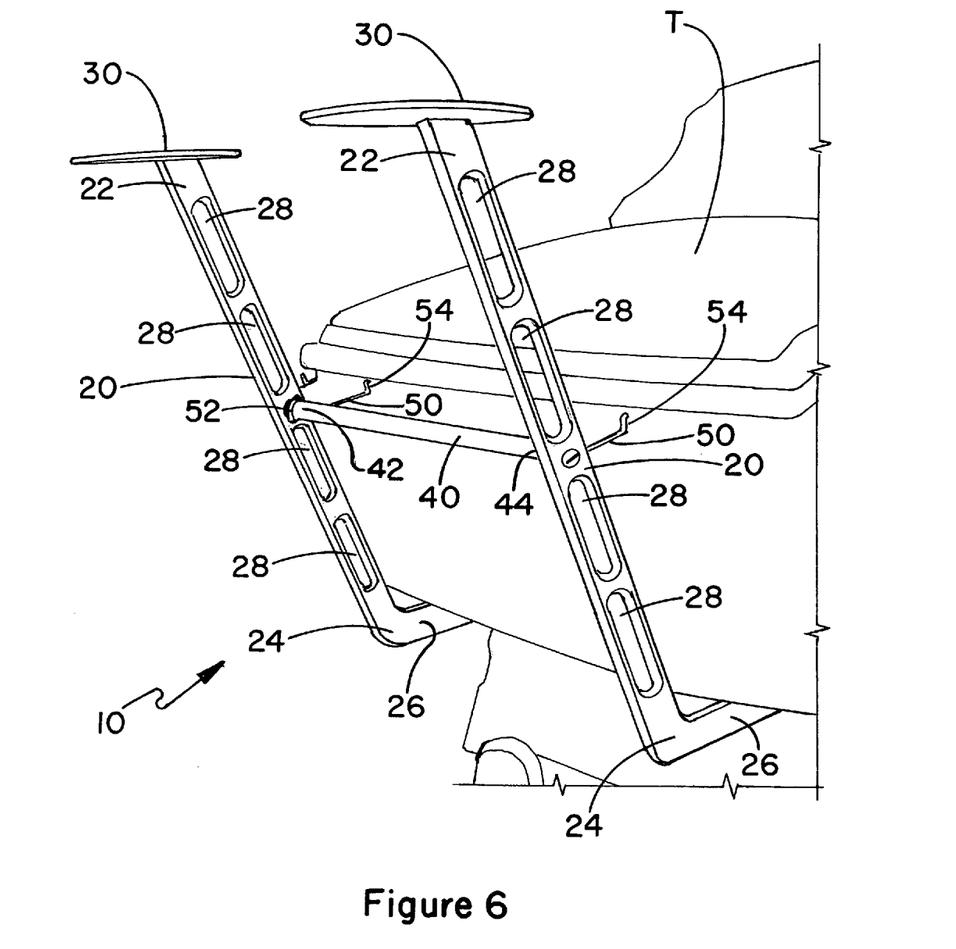
FIG. 6 is a perspective view of a second embodiment of the motorcycle mounted helmet carrier of the present invention mounted on a motorcycle.
Figure 7:
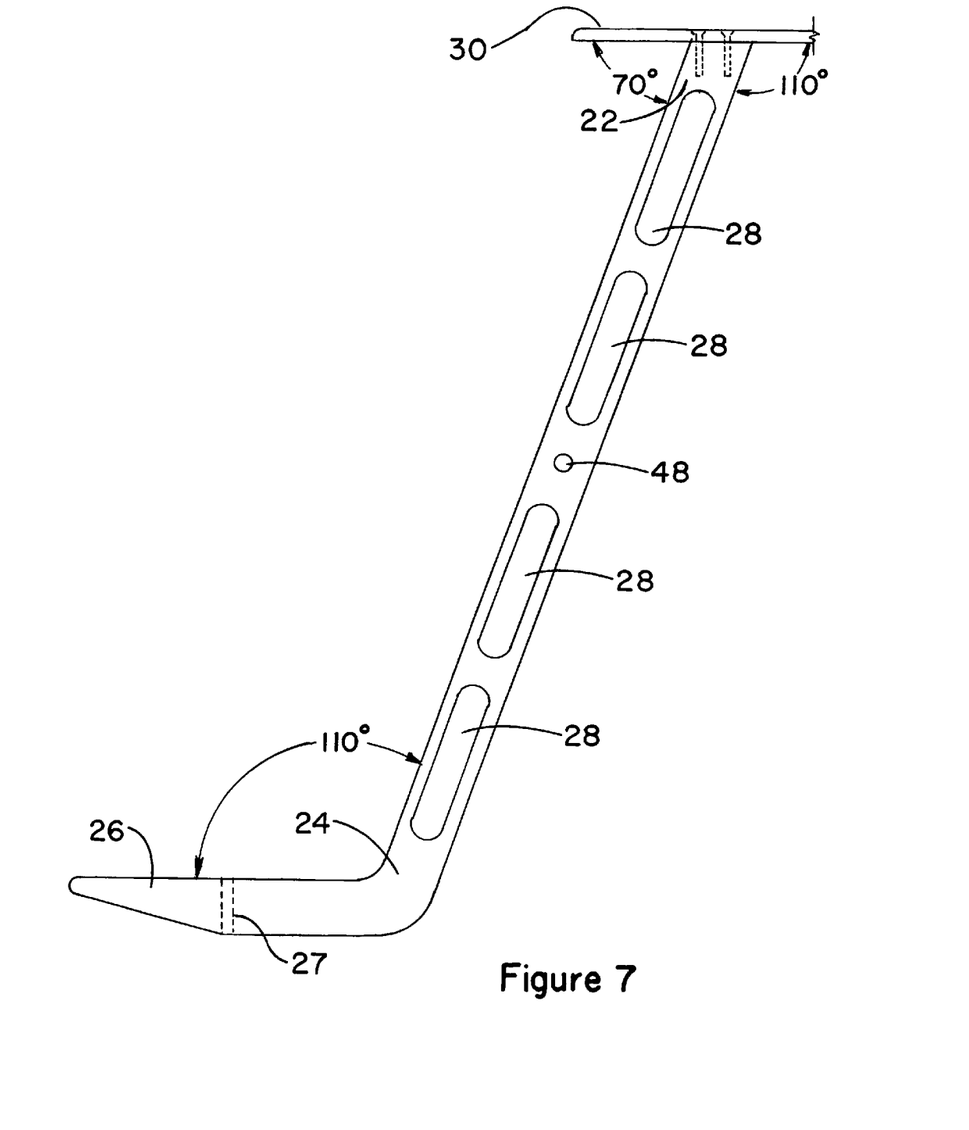
FIG. 7 is a perspective view of the linear support and helmet pad of the second embodiment of the motorcycle mounted helmet carrier of the present invention.
Figure 8:
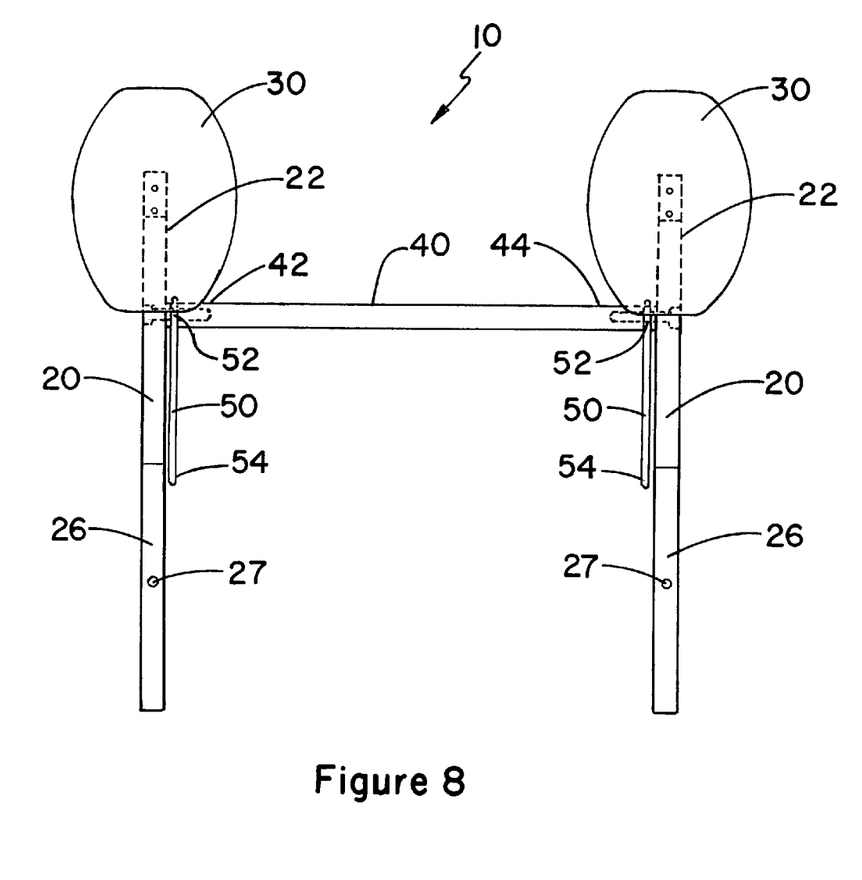
FIG. 8 is a top view of the second embodiment of the motorcycle mounted helmet carrier of the present invention.
Figure 9:
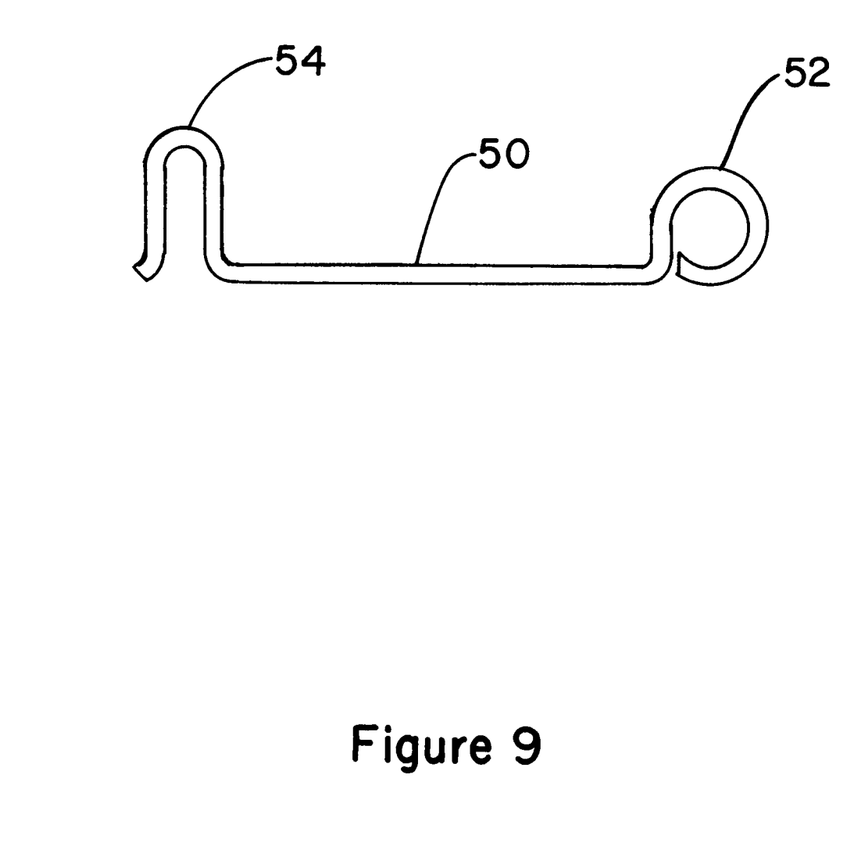
FIG. 9 is a perspective view of the luggage carrier clip of the second embodiment of the motorcycle mounted helmet carrier of the present invention.

Referring now to FIGS. 6-10, a second embodiment of the motorcycle helmet carrier device 10 is shown. The helmet carrier device 10 includes a pair of linear support members 20, each having a first end 22 and a second end 24, as shown in FIG. 7. Each support member 20 has a helmet receiving support plate member 30 that is planar and mounted at a slight angle at the first end 22 of the linear support member 20. A pair of threaded fasteners, shown in phantom in FIG. 7, secures each helmet receiving support plate member 30 to the first end 22 of the linear support member 20. The support plate member 30 is sized to fit against the interior top surface of a motorcycle safety helmet H. A linear connecting rod member 40 (FIG. 3) is secured at each end 42, 44 to one linear support member 20 to maintain the pair of support members 20 in parallel register, as shown in FIG. 6. Preferably, each end 42, 44 of the connecting rod member 40 includes a threaded channel 46 that accepts a threaded fastener inserted through a fastener aperture 48 at about a midpoint of each linear support member 20. The second end 24 of each linear support member 20 attaches to a storage trunk T mounted at the rear of a motorcycle. The second end 24 of the linear support members 20 each includes an offset section 26 with at least one fastener aperture 27 there through. Preferably, the offset section 26 with fastener aperture 27 there through is offset from the linear support member 20 at 110 degrees, as shown in FIG. 7. Similarly, the planar, support plate member 30 is maintained parallel to the offset section 26, at a 110-degree angle with the linear support member 20. The offset section 26 secures each linear support member 20 to the under side of a storage trunk T on the motorcycle by means of fasteners (not shown) inserted through the fastener apertures 27 in the offset section 26 and into the bottom of the storage trunk T. With the offset section 26 secured against the bottom of the storage trunk T, the helmet carrier device 10 of FIGS. 6-10 extends rearward from the storage trunk T and does not interfere with opening or closing of the lid of the storage trunk T. For additional stability and support of the motorcycle helmet carrier device 10, a pair of attachment clip members 50 are each fastened at a first end 52 to the linear connector rod member 40 and at a second end 54, to the open edge of the storage trunk T mounted at the rear of the motorcycle. Preferably, the first end 52 of the attachment clip member 50 is pivotally attached to and encircles the connecting rod member 40. The second end 54 of the attachment clip member 50 contains an inverted U-shaped section that snaps over the open edge of the storage trunk T. Closing the lid of the storage trunk T further secures the second end 54 of the attachment clip member 50 to the storage trunk T. An enlarged, side view of an attachment clip member 50 is provided in FIG. 9. A top view of the present embodiment of the motorcycle helmet carrier device 10 is shown in FIG. 8.

Figure 10:
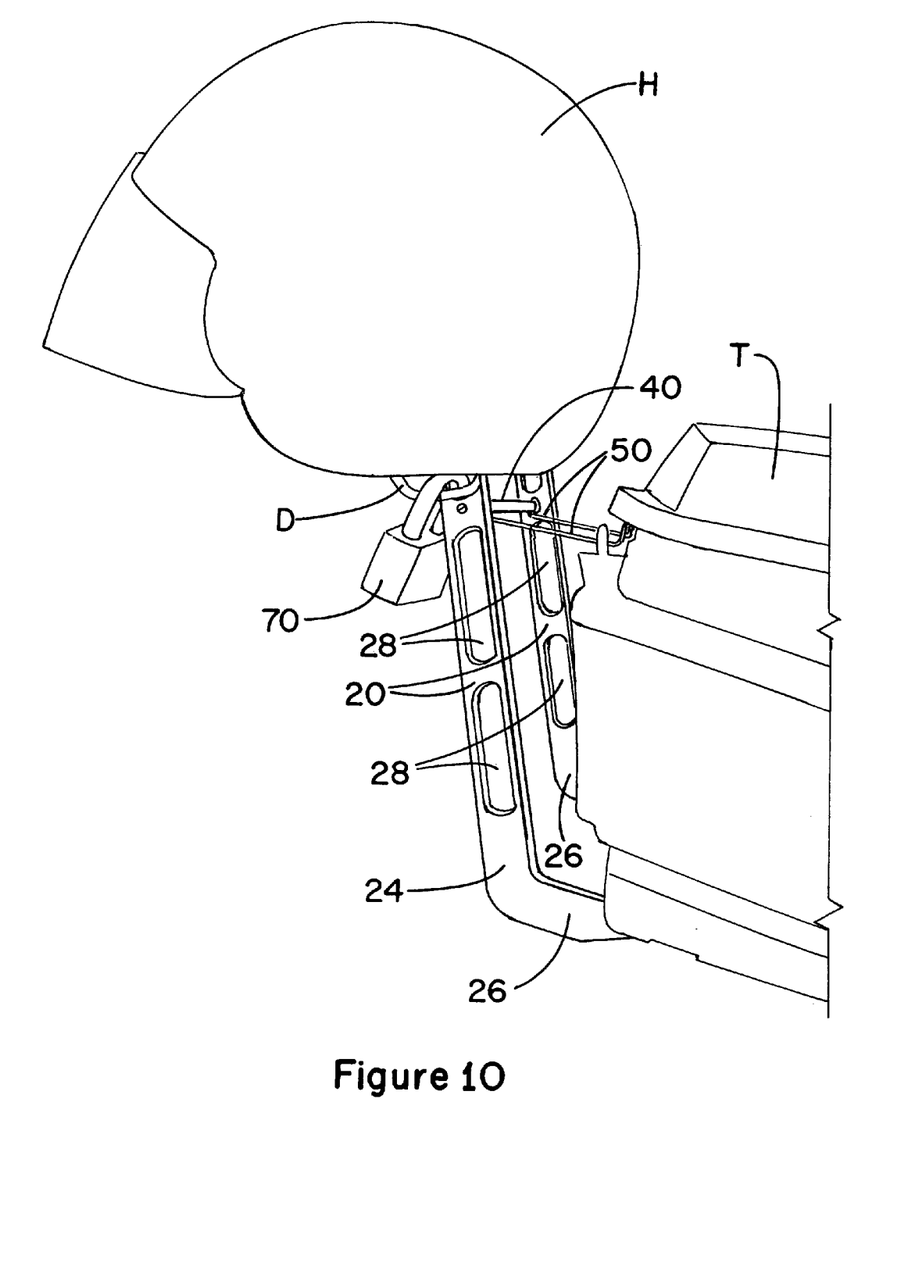
FIG. 10 is a perspective view of the second embodiment of the motorcycle mounted helmet carrier of the present invention with a helmet secure thereto with a locking device.

Each linear support member 20 includes at least one aperture adjacent the helmet receiving support plate member 30 at the first end 22 thereof. In the embodiment of the helmet carrier device 10 of FIGS. 6-10, each linear support member 20 includes a plurality of evenly spaced, large apertures 28 along the length of each support member 20. Each linear support member 20 with apertures 28 therein is adapted for locking a motorcycle safety helmet H supported upright upon the support plate member 30 to the linear support member 20 with a locking device 70, as illustrated in FIG. 10. The upright supported helmet H is locked to the helmet carrier device 10, for example, by passing the clasp of a padlock 70 through the D-ring D of the helmet strap and one of large apertures 28 of the support member 20 and closing the clasp of the padlock 70. The safety helmet H is maintained in an upright position and cannot be lifted off the support plate member 30 on the support member 20. The upright orientation of the safety helmet H prevents rain or snow from entering the interior of the helmet H when positioned and/or locked on the helmet carrier device 10.

In a preferred embodiment of the invention, the linear support members 20, the helmet receiving support plate members 30 and the linear connecting rod member 40 of the motorcycle mounted helmet carrier device 10 of FIGS. 6-10 are fabricated from cast aluminum for durability, corrosion resistance and lightness of weight.

While the invention has been particularly shown and described with reference to preferred embodiments thereof, it will be understood by those skilled in the art that various changes in form and details may be made therein without departing from the spirit and scope of the invention.

I claim:

1. A motorcycle mounted helmet carrier device comprising:
  a pair of linear support members each having first and second ends, each with a helmet receiving support plate at the first end thereof;
  a linear connecting rod secured at each end thereof to one linear support member to maintain the pair of support members in parallel register;
  the second end of the linear support members each including an offset section with fastener apertures there through, the linear support member and offset section with fastener apertures there through forming a 110 degree angle there between, the offset section adapted for securing each linear support member to a storage trunk on the motorcycle;
  a pair of attachment clip members each rotatably fastened at a first end to the linear connector rod member, a second end of each clip member having a U-shaped section adapted for attachment to an open edge of a storage trunk on the motorcycle; and
  each linear support member including at least one aperture therein adjacent the helmet receiving support plate at the first end thereof, the linear support member with aperture therein adapted for locking a helmet supported upon the support plate to the linear support member.

2. The motorcycle mounted helmet carrier device of claim 1, further including a locking device engaging the linear support member at the at least one aperture therein, the locking device adapted for engaging and locking a helmet supported upright on the support plate member to the linear support member.

3. The motorcycle mounted helmet carrier device of claim 1, wherein the linear support members, the helmet receiving support plate members and the linear connecting rod member are fabricated from cast aluminum.

4. A motorcycle mounted helmet carrier device comprising:
  a pair of linear support members each having first and second ends, each with a helmet receiving support plate member at the first end thereof and each with a pair of parallel groves oriented across a longitudinal length of each linear support member and a pair of attachment apertures at the second end thereof;
  a linear connecting rod member secured at each end thereof to one linear support member to maintain the pair of support members in parallel register;
  a pair of U-shaped attachment bracket members, each bracket member having a pair of outer edges, each edge positioned in one of the pair of parallel grooves at the second end of one linear support member;
  each U-shaped an attachment bracket member secured to the second end of each linear support member via the pair of attachment apertures at the second end thereof, the U-shaped bracket members adapted for securing to a rear fender of a motorcycle; and
  each linear support member including at least one aperture therein adjacent the helmet receiving support plate at the first end thereof, the linear support member with aperture therein adapted for locking a helmet supported upright upon the support plate to the linear support member.

5. The motorcycle mounted helmet carrier device of claim 4, further including a locking device engaging the linear support member at the at least one aperture therein, the locking device adapted for engaging and locking a helmet supported upright on the support plate member to the linear support member.

6. The motorcycle mounted helmet carrier device of claim 4, wherein the linear support members, the helmet receiving support plate members and the linear connecting rod member are fabricated from cast aluminum.

* * * * *